(12) United States Patent
Kerselaers et al.

(10) Patent No.: US 11,011,826 B2
(45) Date of Patent: May 18, 2021

(54) NEAR-FIELD ELECTROMAGNETIC INDUCTION (NFEMI) DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 738 days.

(21) Appl. No.: 15/420,621

(22) Filed: Jan. 31, 2017

(65) Prior Publication Data
US 2018/0219273 A1    Aug. 2, 2018

(51) Int. Cl.
| | |
|---|---|
| *H01Q 1/22* | (2006.01) |
| *H04B 5/00* | (2006.01) |
| *H01Q 1/27* | (2006.01) |
| *H01Q 1/38* | (2006.01) |
| *H01Q 1/48* | (2006.01) |
| *H01Q 7/08* | (2006.01) |

(52) U.S. Cl.
CPC ......... *H01Q 1/2291* (2013.01); *H01Q 1/2283* (2013.01); *H01Q 1/273* (2013.01); *H01Q 1/38* (2013.01); *H01Q 1/48* (2013.01); *H01Q 7/08* (2013.01); *H04B 5/0031* (2013.01); *H04B 5/0081* (2013.01); *H04B 5/0093* (2013.01); *H04B 5/0006* (2013.01); *H04B 5/0037* (2013.01)

(58) Field of Classification Search
CPC combination set(s) only.
See application file for complete search history.

(56) References Cited

U.S. PATENT DOCUMENTS

| | | | |
|---|---|---|---|
| 6,211,799 B1 * | 4/2001 | Post | A61B 5/0028 |
| | | | 341/33 |
| 8,532,568 B2 | 9/2013 | Kerselaers | |
| 9,197,986 B1 | 11/2015 | Kerselaers et al. | |
| 2004/0032706 A1 * | 2/2004 | Kemmochi | H03H 7/465 |
| | | | 361/306.3 |
| 2011/0300801 A1 * | 12/2011 | Kerselaers | H04B 5/0031 |
| | | | 455/41.1 |
| 2015/0270719 A1 | 9/2015 | Kurs et al. | |
| 2015/0280318 A1 * | 10/2015 | Yang | H01Q 9/40 |
| | | | 343/841 |

(Continued)

OTHER PUBLICATIONS

U.S. Appl. No. 14/836,681 not yet published; 28 pages (filed Aug. 26, 2015).

*Primary Examiner* — Zhitong Chen (57) ABSTRACT

Example of a near-field electromagnetic induction (NFEMI) device, including: an NFEMI antenna, having a first conductive plate, a coil, a first signal feed connection, and a second signal feed connection; wherein the coil is configured to generate or respond to a magnetic field and is coupled to the first and second signal feed connections; wherein the first conductive plate is coupled to the first signal feed connection; and an electrical apparatus, having a ground plane, a first capacitor and a second capacitor; wherein the electrical apparatus is coupled to the first and second signal feed connections; wherein the first capacitor is coupled between the first signal feed connection and the ground plane; wherein the second capacitor is coupled between the second signal feed connection and the ground plane; and wherein the first conductive plate in combination with the ground plane is configured to generate or respond to an electrical field.

18 Claims, 8 Drawing Sheets

(56) References Cited

U.S. PATENT DOCUMENTS

2015/0318932 A1* 11/2015 Kerselaers ............. H04R 25/55
                                                                381/315
2015/0319545 A1    11/2015 Kerselaers et al.
2016/0028446 A1     1/2016 Moon et al.
2016/0241306 A1     8/2016 Moon et al.
2016/0315667 A1* 10/2016 Jensen ................. H04B 5/0081

* cited by examiner

NEAR-FIELD ELECTROMAGNETIC INDUCTION (NFEMI) DEVICE

The present specification relates to systems, methods, apparatuses, devices, articles of manufacture and instructions regarding an architecture for an NFEMI device.

SUMMARY

According to an example embodiment, a near-field electromagnetic induction (NFEMI) device, comprising: an NFEMI antenna, having a first conductive plate, a coil, a first signal feed connection, and a second signal feed connection; wherein the coil is configured to generate or respond to a magnetic field and is coupled to the first and second signal feed connections; and wherein the first conductive plate is coupled to the first signal feed connection; and an electrical apparatus, having a ground plane, a first capacitor and a second capacitor; wherein the electrical apparatus is coupled to the first and second signal feed connections; and wherein the first capacitor is coupled between the first signal feed connection and the ground plane; wherein the second capacitor is coupled between the second signal feed connection and the ground plane; and wherein the first conductive plate in combination with the ground plane is configured to generate or respond to an electrical field.

In another example embodiment, the first conductive plate and the ground plane together form a third capacitor configured to generate or respond to the electrical field.

In another example embodiment, the NFEMI antenna includes a second conductive plate coupled to the second signal feed connection; the second conductive plate in combination with the first conductive plate is configured to generate or respond to the electrical field; and the second conductive plate in combination with the ground plane is configured to generate or respond to the electrical field.

In another example embodiment, the second conductive plate and the ground plane together form a fourth capacitor configured to generate or respond to the electrical field.

In another example embodiment, the first and second capacitors are tuning capacitors.

In another example embodiment, the first conductive plate in combination with the second conductive plate is configured to generate or respond to a first voltage associated with the electrical field; the first conductive plate in combination with the ground plane is configured to generate or respond to a second voltage associated with the electrical field; and the second conductive plate in combination with the ground plane is configured to generate or respond to a third voltage associated with the electrical field; and the first, second and third voltages are substantially in phase.

In another example embodiment, the ground plane is embedded within at least one of: an integrated circuit, a receiver, a transmitter, a power amplifier, an LNA, an RF device, a circuit board, a chassis, a mechanical part, an electrical part.

In another example embodiment, the electrical apparatus is embedded in the first conductive plate but the ground plane is electrically isolated from the first conductive plate.

In another example embodiment, the first conductive plate includes an opening; and the ground plane is electrically isolated from the first conductive plate by the opening.

In another example embodiment, the ground plane is a solid continuous plane of conductive material.

In another example embodiment, the ground plane is a set of electrical traces coupled to electrical circuits in the electrical apparatus.

In another example embodiment, the ground plane is a set of electrical traces isolated from all electrical circuits in the electrical apparatus.

In another example embodiment, the coil is either wound around a ferrite material or formed on a surface of a planar substrate.

In another example embodiment, the device is a wearable device.

In another example embodiment, the NFEMI antenna is configured to operate at a carrier communications frequency below 30 MHz or at about 10.6 MHz.

In another example embodiment, the electrical apparatus includes at least one of: radio functionality, wireless functionality, a microprocessor, a digital signal processor, an audio amplifier, a data processing unit, or a human interface unit.

According to an example embodiment, a wearable device including a near-field electromagnetic induction (NFEMI) apparatus, comprising: an NFEMI antenna, having a first conductive plate, a coil, a first signal feed connection, and a second signal feed connection; wherein the coil is configured to generate or respond to a magnetic field and is coupled to the first and second signal feed connections; and wherein the first conductive plate is coupled to the first signal feed connection; and an electrical apparatus, having a ground plane, a first capacitor and a second capacitor; wherein the electrical apparatus is coupled to the first and second signal feed connections; and wherein the first capacitor is coupled between the first signal feed connection and the ground plane; wherein the second capacitor is coupled between the second signal feed connection and the ground plane; and wherein the first conductive plate in combination with the ground plane is configured to generate or respond to an electrical field.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Example embodiments of a near-field electromagnetic induction (NFEMI) communication system can operate near a human body by means of a combination of a magnetic field and electric field without the use of transversal radiating waves. Such NFEMI systems improve a wearable device's signal link budget and extend their range to a complete human body.

Whereas RF wireless communication may be accomplished by propagating an RF plane wave through free space, NFEMI communication utilizes non-propagating quasi-static fields. The quasi-static characteristic of the fields is the result of antenna dimensions in combination with the carrier frequency. The majority of the energy is stored in the form of magnetic and electric fields and a small amount of RF energy inevitably propagates in free space.

Small antenna geometries compared with the carrier wavelength are candidate for near field communication since they do not generate radiating waves in free space. Such an antenna can be a coil antenna that allows near field magnetic induction (NFMI). Other antennas communicate by means of both magnetic and electric near fields via near field electromagnetic induction (NFEMI). Such an antenna when in close proximity to the body will generate fields that are confined near the body.

Figure 1A:
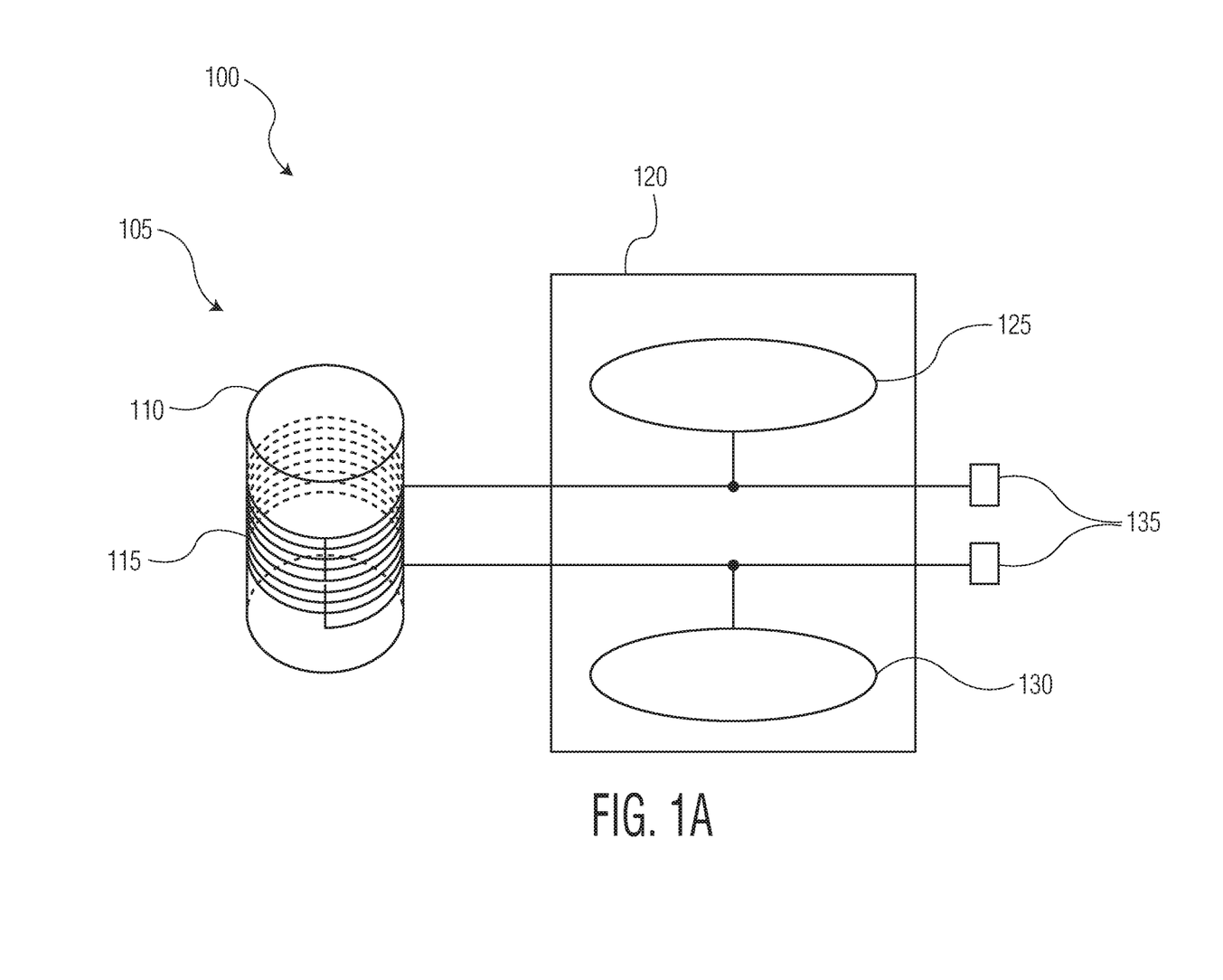
FIG. 1A is an example first NFEMI antenna.

FIG. 1A is an example first NFEMI antenna 100 for a near-field electromagnetic induction (NFEMI) device. The NFEMI antenna 100 may include a coil antenna 105 (i.e. a magnetic antenna) in conjunction with a short loaded dipole 120 (i.e. an electric antenna). The coil antenna 105 may include a ferrite core 110 with a wire 115 wound around the core 110. The short dipole 120 may include two loading plates 125 and 130. In close proximity of the body, this antenna will provide fields that are confined near the body. The preferred transmit frequency is below 30 MHz to ensure that the fields are following the body contours and far field radiation is strongly reduced. The coil antenna 105 and two loading plates 125 and 130 are coupled to a first and second signal feed connections 135 which provide electrical connection to a receiver and/or transmitter circuit.

Figure 1B:
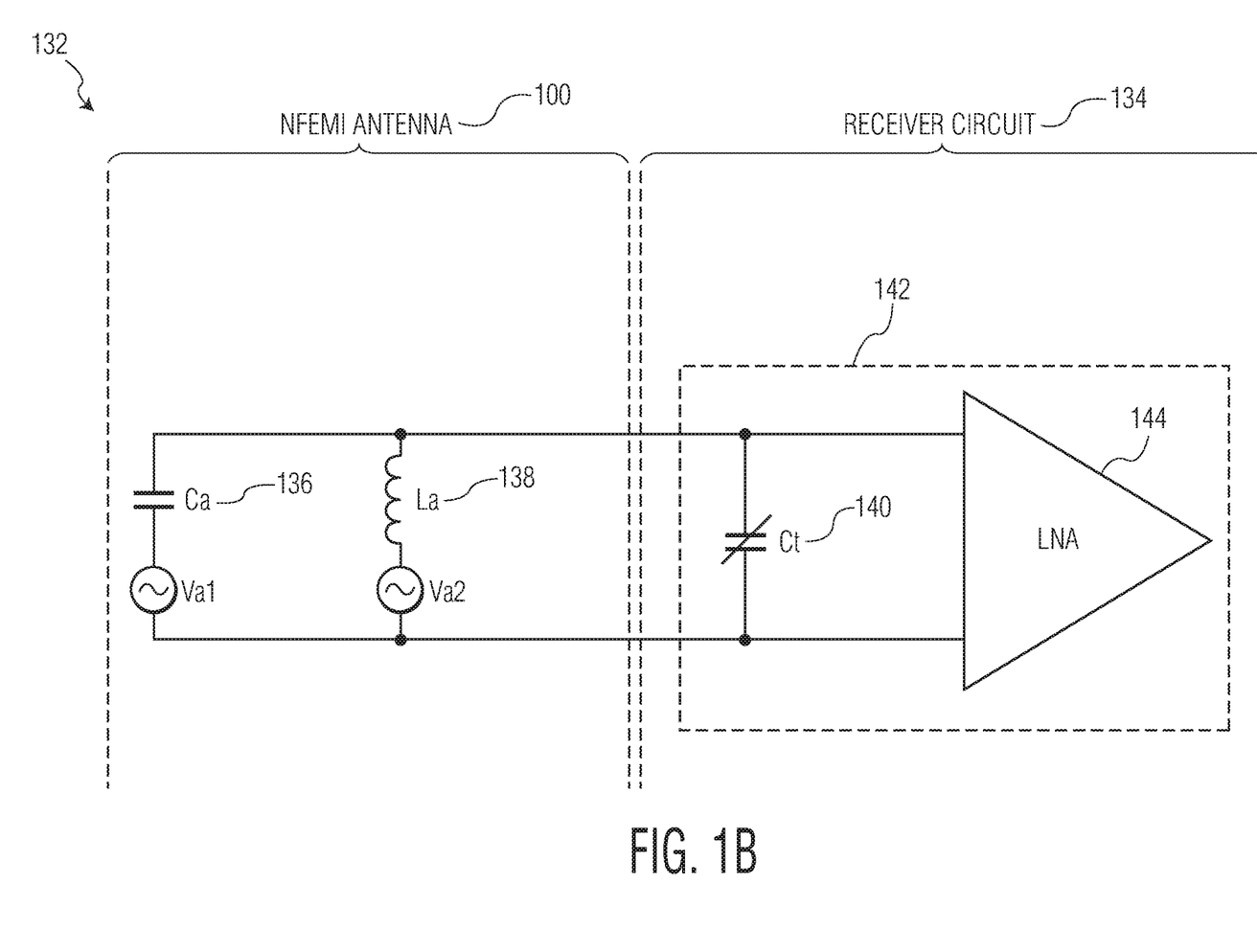
FIG. 1B is an example equivalent circuit including the first NFEMI antenna connected to a receiver circuit.

FIG. 1B is an example equivalent circuit 132 including the first NFEMI antenna 100 connected to a receiver circuit 134. The equivalent circuit 132 includes an equivalent capacitance (Ca) 136 formed by the two loading plates 125 and 130 of the short loaded dipole 120. An equivalent inductance (La) 138 is formed by the ferrite core 110 and wire 115 of the coil antenna 105.

During operations, near fields in proximity to the NFEMI antenna 100 generates voltage (Va2) in the equivalent inductance (La) 138 and voltage (Va1) in the equivalent capacitance (Ca) 136.

Both antennas 105, 120 are in an electrically parallel configuration and further connected to a tuning capacitor (Ct) 140. The tuning capacitor (Ct) 140 is selected to enable the NFEMI antenna 100 to resonate at an NFEMI carrier frequency. A resistor bank (not shown) in parallel with the tuning capacitor (Ct) 140 adjusts a frequency bandwidth of the circuit 132.

In some example embodiments, the tuning capacitor (Ct) 140 may be embedded within an RF integrated circuit (RF IC) 142 that also includes a low noise amplifier (LNA) 144. Further NFEMI communication functions can be added at a back-end of this circuit 142.

NFEMI devices such as the first NFEMI antenna 100 discussed above use small antenna components compared with a wavelength of the NFEMI carrier frequency. Such small components can be susceptible to interference generated by other mechanical and electrical components, such as the RF integrated circuit (RF IC) 142. Such interference can degrade the NFEMI's device's communications range.

Now discussed is an NFEMI device where the device's mechanical and electrical components and their fixation and connections are used to enhance the robustness of the communication link. This device includes an antenna structure connected to its companion integrated circuitry, and a ground plane connected to such circuitry. The ground plane is configured to be capacitively coupled to the antenna's structure thereby enhancing the NFEMI's device's communications range.

Such an NFEMI device can have smaller dimensions than a standard communication device with the same performance. Applications of the NFEMI device include: portable devices, portable devices positioned around a body (e.g. hearing aids, body network devices for healthcare applications), and other devices having NFEMI functionality.

Figure 2A:
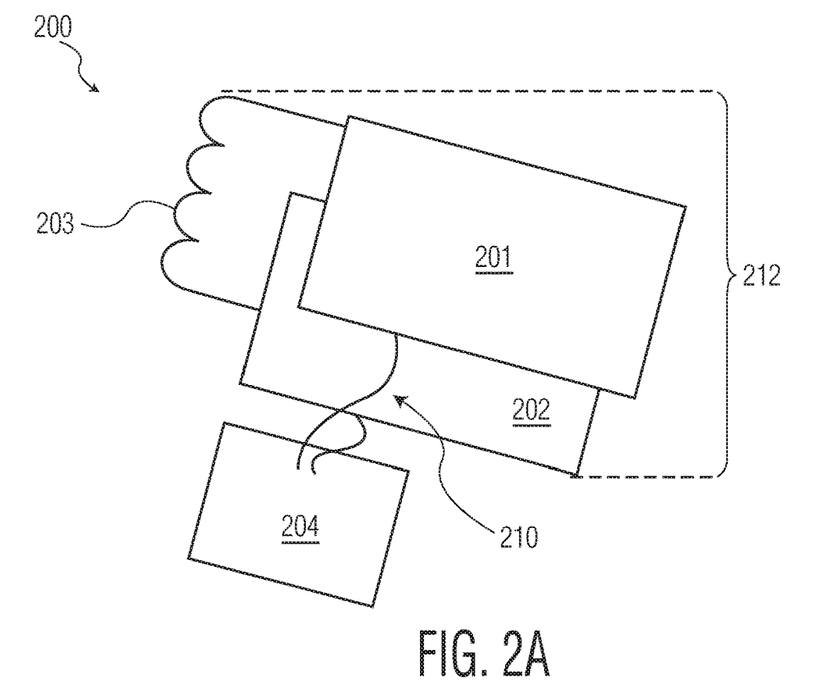
FIG. 2A is an example first NFEMI device configuration of a second NFEMI antenna coupled to an electrical apparatus.

FIG. 2A is an example first NFEMI device configuration 200 of a second NFEMI antenna 212 coupled to an electrical apparatus 204. The second NFEMI antenna 212 includes near-field magnetic (i.e. antenna coil 203) and electric (i.e. two conductive loading plates 201 and 202) induction antennas. In this embodiment the two conductive loading plates 201 and 202 are coupled to the electrical apparatus 204 with a first and second signal feed connection wires 210.

The NFEMI antenna 212 is configured to operate at various carrier communications frequencies, such as below 30 MHz or at about 10.6 MHz.

The electrical apparatus 204 in various embodiments can include: an integrated circuit (IC), a circuit board, a flexible substrate, or some other set of mechanical and electrical parts. The electrical apparatus 204 in various embodiments may also include a receiver circuit and/or a transmitter circuit.

The antenna coil 203 could be a single coil or include multiple coils. The coil 203 could also be either wound around a ferrite material or formed on a surface of a planar substrate.

In various example embodiments, the electrical apparatus 204 may also include: radio functionality, a microprocessor, a digital signal processor, an audio amplifier, a data processing unit, a human interface unit, and/or an antenna.

Figure 2B:
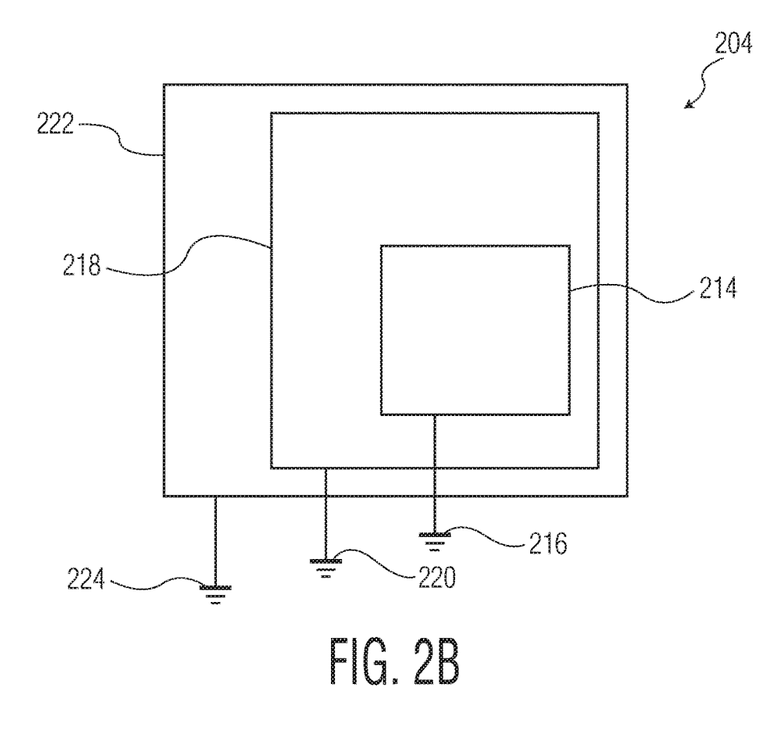
FIG. 2B is an example of the electrical apparatus coupled to one or more ground planes.

The electrical apparatus 204 is also coupled to a ground plane, as now discussed in FIG. 2B.

FIG. 2B is an example of the electrical apparatus 204 coupled to one or more ground planes. In one example embodiment, the second NFEMI antenna 212 is coupled to an integrated circuit 214 which is coupled to a first ground plane 216. In another example embodiment, the second NFEMI antenna 212 is coupled to a circuit board 218 which is coupled to a second ground plane 220. And in yet another example embodiment, the second NFEMI antenna 212 is coupled to a chassis, mechanical parts, and/or electrical parts 222 which is/are coupled to a third ground plane 224. In other example embodiments the ground plane can be electrically reached through an external wired connection (not shown).

Ground plane is herein defined to include a variety of structures including: a solid continuous plane of conductive material, a set of electrical traces in any orientation but configured to be coupled to ground, a chassis structure holding either the antenna 212 and/or electrical apparatus 204, or any other ground connected structure.

Figure 2C:
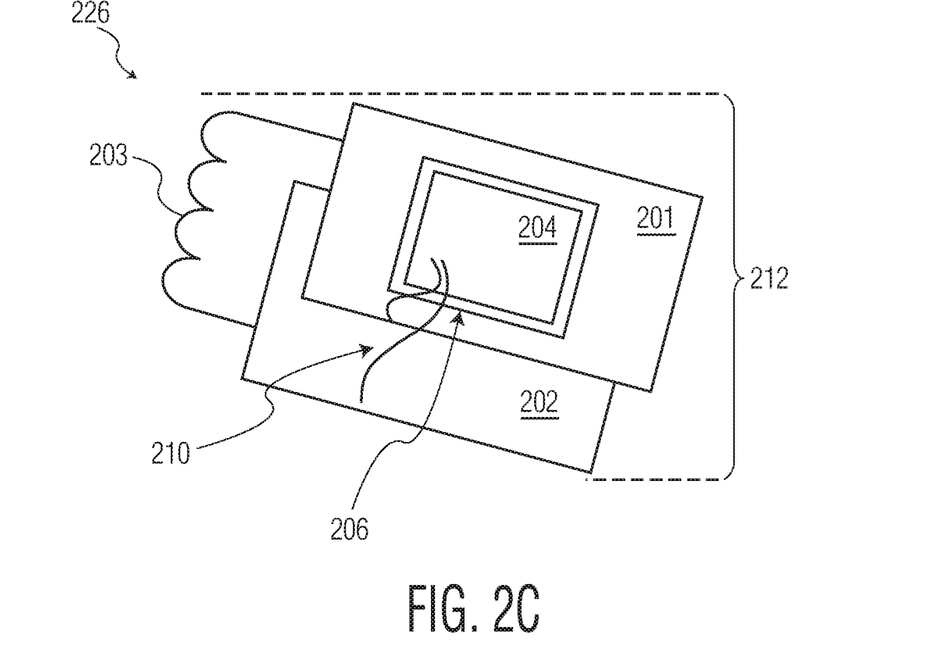
FIG. 2C is an example second NFEMI device configuration of the second NFEMI antenna coupled to the electrical apparatus.

FIG. 2C is an example second NFEMI device configuration 226 of the second NFEMI antenna 212 coupled to the electrical apparatus 204. In this example embodiment, the electrical apparatus 204 containing the ground plane is embedded in conductive loading plate 201. Internal electrical components within the electrical apparatus 204 are connected to the ground plane, examples of which are given in later Figures. In this example, the ground plane is isolated from the conductive loading plate 201 by an opening 206.

Figure 2D:
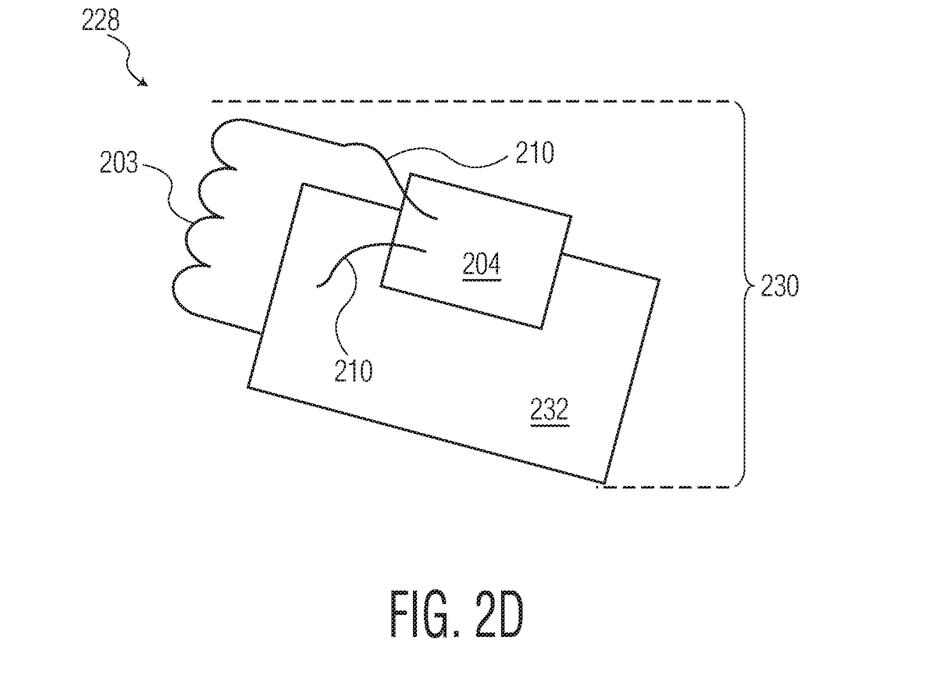
FIG. 2D is an example third NFEMI device configuration of a third NFEMI antenna coupled to the electrical apparatus.

FIG. 2D is an example third NFEMI device configuration 228 of a third NFEMI antenna 230 coupled to the electrical apparatus 204. In this example embodiment there is only one conductive loading plate 232 and the first signal feed connection wire 210 is coupled to the conductive loading plate 232 while the second signal feed connection wire 210 is coupled directly to the coil 203. Operation in this third device configuration 228 is electrically similar to that which will be discussed in FIGS. 3, 4, 5 and 6 except that Cb2 is no longer present and Ca is formed between the one conductive loading plate 232 and one or more of the ground plane(s) 216, 220, 224.

Thus in this one conductive loading plate 232 design, the near-field electromagnetic induction (NFEMI) device, includes: an NFEMI antenna, having a first conductive plate, a coil, a first signal feed connection, and a second signal feed connection; and an electrical apparatus, having a ground plane, a first capacitor, and a second capacitor. The coil is configured to generate or respond to a magnetic field and is coupled to the first and second signal feed connections; and the first conductive plate is coupled to the first signal feed connection.

The electrical apparatus is coupled to the first and second signal feed connections; the first capacitor is coupled between the first signal feed connection and the ground plane; the second capacitor is coupled between the second signal feed connection and the ground plane; and the first conductive plate in combination with the ground plane forms a third capacitor and is configured to generate or respond to an electrical field.

However in the two conductive loading plate design of FIGS. 1A, 2A and 2C, the NFEMI antenna includes a second conductive plate coupled to the second signal feed connection. The second conductive plate in combination with the first conductive plate is configured to generate or respond to the electrical field. The second conductive plate in combination with the ground plane forms a fourth capacitor and is configured to generate or respond to the electrical field.

The first conductive plate in combination with the second conductive plate is configured to generate or respond to a first voltage associated with the electrical field. The first conductive plate in combination with the ground plane is configured to generate or respond to a second voltage associated with the electrical field. The second conductive plate in combination with the ground plane is configured to generate or respond to a third voltage associated with the electrical field. Because of this configuration, the first, second and third voltages are substantially in phase and reinforce each other.

Figure 3:
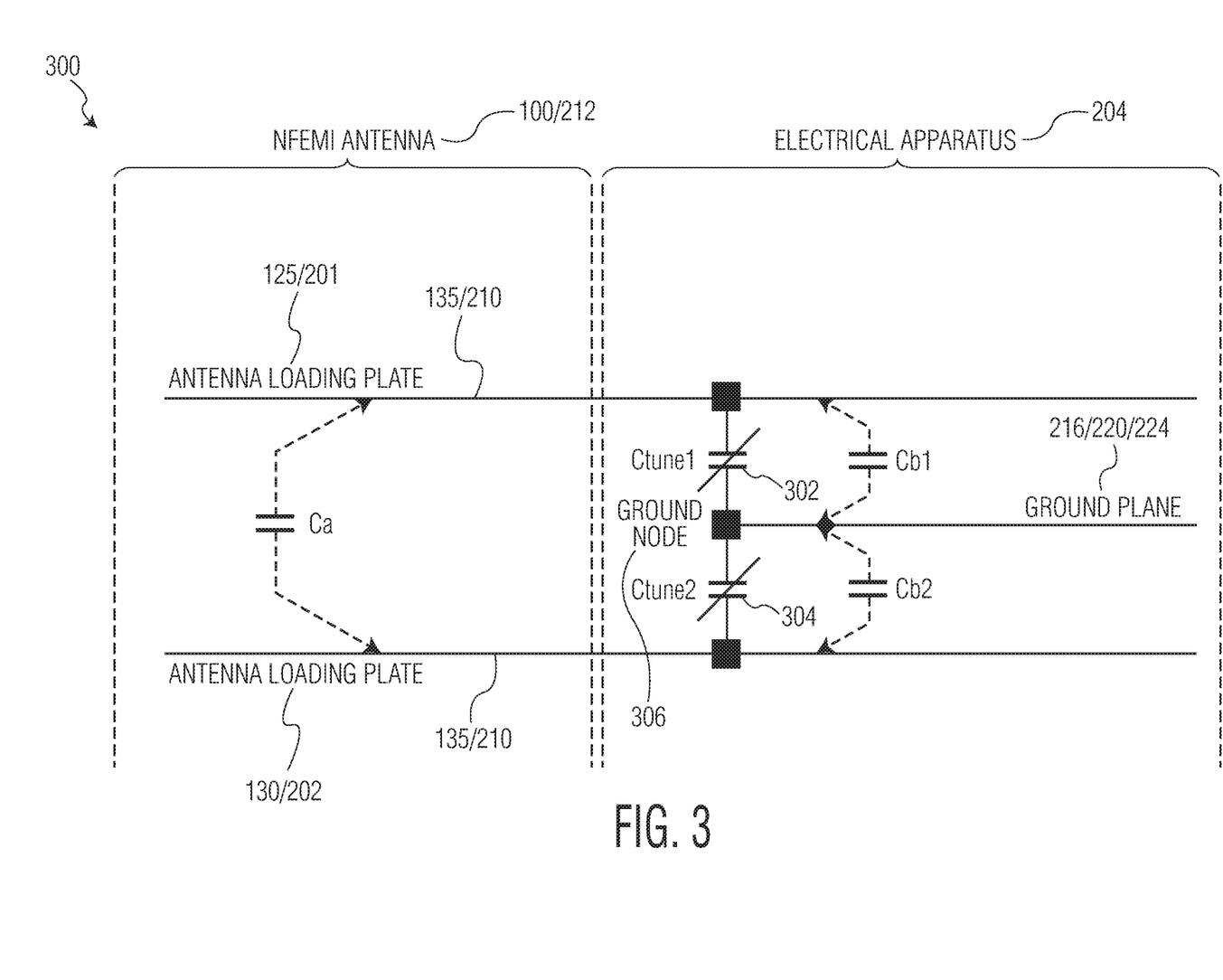
FIG. 3 is a first example electrical circuit for coupling either the first or second NFEMI antenna to the electrical apparatus.

FIG. 3 is a first example electrical circuit 300 for coupling either the first or second NFEMI antennas 100, 212 to the electrical apparatus 204. The loading plates 125, 130 or 201, 202 are coupled to the electrical apparatus 204 with the signal feed connections 135 or 210.

A first tuning capacitor 302 (Ctune1) couples loading plate 125, 201 to a ground node 306. A second tuning capacitor 304 (Ctune2) couples loading plate 130, 202 to the ground node 306. The ground node 306 is coupled to the ground plane(s) 216, 220, 224. Both tuning capacitors 302, 304 are connected in series with respect to each other.

Because the first and second tuning capacitors 302, 304 are coupled to the ground plane(s) 216, 220, 224 additional capacitances Cb1 and Cb2 also arise. As will be discussed in more detail in FIG. 4, these additional capacitances Cb1 and Cb2 generate additional voltages which improve the robustness of the communication link between various NFEMI devices (e.g. 200, 226, etc.).

Thus by connecting the first and second tuning capacitors 302, 304 to one or more of the ground plane(s) 216, 220, 224, such ground plane(s) 216, 220, 224 also function as capacitive antenna(s) yielding extra generated voltages and boosting signals received and transmitted by the NFEMI antennas 100, 212.

The capacitances Cb1 and Cb2 can be varied by adjusting distances between the loading plates 125, 130 or 201, 202 and the ground planes 216, 220, 224. The capacitances Cb1 and Cb2 can also be varied by adjusting physical surface characteristics of the loading plates 125, 130 or 201, 202, by adjusting physical surface characteristics of the electrical apparatus 204 and/or by adjusting physical surface characteristics of the ground planes 216, 220, 224. Additional techniques for varying the capacitances Cb1 and Cb2 include repositioning the loading plates with respect to the ground plane(s) and/or varying a dielectric between the loading plates and the ground plane(s).

Figure 4:
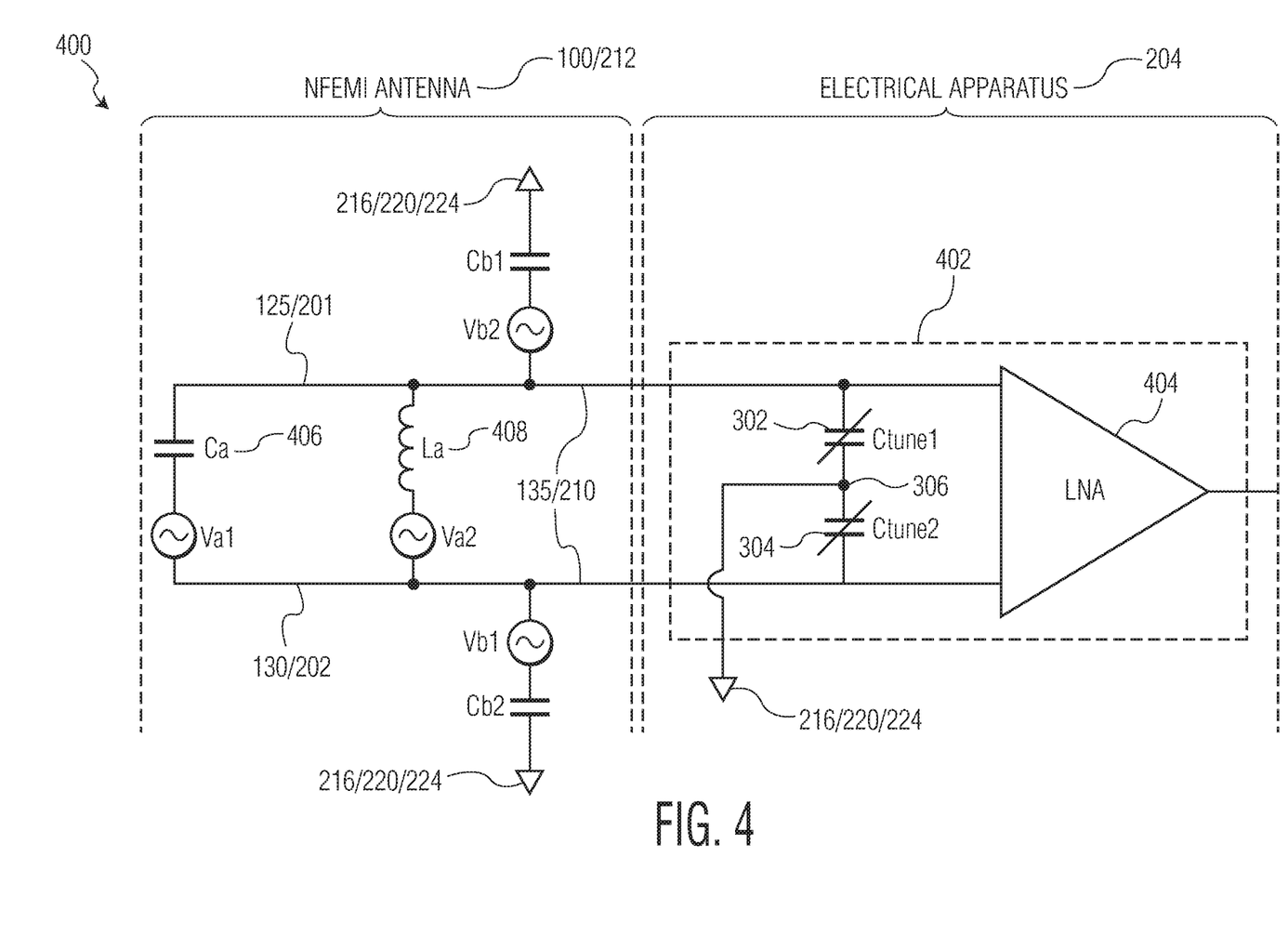
FIG. 4 is a second example electrical circuit for coupling either the first or second NFEMI antenna to the electrical apparatus.

FIG. 4 is a second example electrical circuit 400 for coupling either the first or second NFEMI antenna 100, 212 to the electrical apparatus 204. In this example circuit 400 the electrical apparatus 204 includes a receiver circuit 402 having an LNA (low noise amplifier) 404. The receiver circuit 402 includes the first tuning capacitor 302 (Ctune1) coupling loading plate 125, 201 to the ground node 306, and the second tuning capacitor 304 (Ctune2) coupling loading plate 130, 202 to the ground node 306. The ground node 306 is coupled to the one or more of the ground planes 216, 220, 224.

In FIG. 4, for clarity, capacitances Cb1 and Cb2 (i.e. due to the physical positioning of the load plates and the ground plane(s)) are shown in a different logical position than in FIG. 3. And introduced in FIG. 3, voltages Vb1 and Vb2 are generated in series with capacitances Cb1 and Cb2 when the NFEMI antenna 100, 212 is positioned in an electrical field. Voltage Va1 in equivalent capacitance (Ca) 406 is also generated when the NFEMI antenna 100, 212 is positioned in the electrical field.

Voltage Va2 in equivalent inductance (La) 408 is generated when the NFEMI antenna 100, 212 is positioned in a magnetic field.

The additional voltages Vb1 and Vb2 add to voltages Va1 and Va2 and thus boost the NFEMI communications signal sent to the electrical apparatus 204 (e.g. resulting in an increased received voltage at the input of the LNA 404 in the receiver circuit 402).

A first example of how variations in a size of different ground planes effects voltages Vb1 and Vb2 and thus effects the NFEMI communications signal is now discussed. The first ground plane connected device has a total size of 25×10 mm and 10 mm thickness. The second ground plane connected device has an overall size of 50×45 mm and overall thickness of 10 mm. Testing has shown that the second device has an increase in signal link budget of 6 dB, thereby indicating that varying a size of the ground plane(s) effects the NFEMI antenna's sensitivity (i.e. a larger ground plane results in a more efficient antenna).

Note, the link budget in this example was calculated as: Link budget=Rx_voltage/Tx_voltage, Rx_voltage: voltage at the LNA 404 input and Tx_voltage: voltage at a transmit antenna.

A second example of how variations in a position of different ground planes effects voltages Vb1 and Vb2 and thus effects the NFEMI communications signal is now discussed. As before, the first device has a total size of 45×45 mm and 10 mm thickness, and the second device has an overall size of 50×45 mm and overall thickness of 10 mm. By varying the positions of the the loading plates 125, 130 or 201, 202 and the ground planes 216, 220, 224 a variation in electrical field strength of 3 dB was observed.

Figure 5:
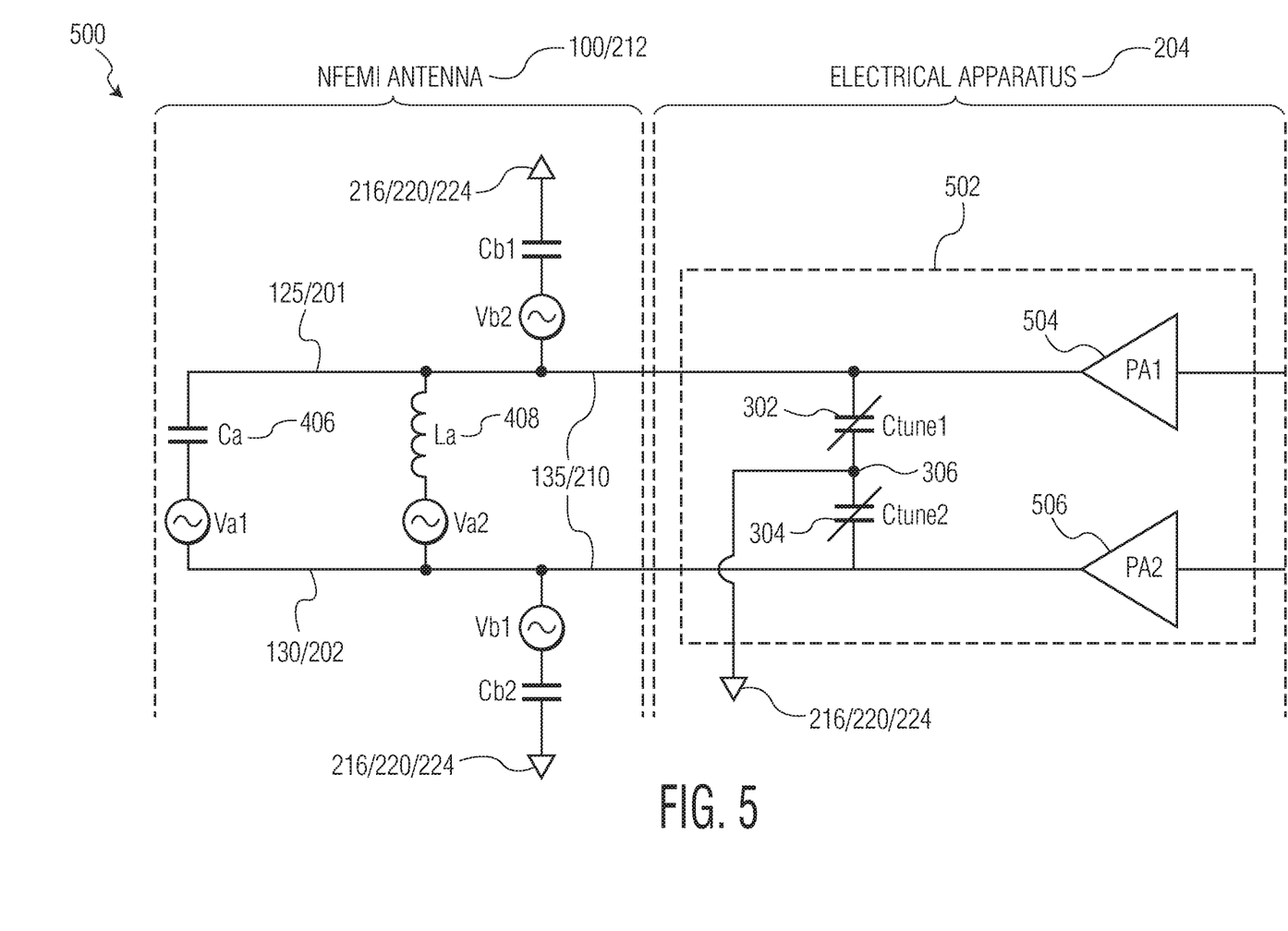
FIG. 5 is a third example electrical circuit for coupling either the first or second NFEMI antenna to the electrical apparatus.

FIG. 5 is a third example electrical circuit 500 for coupling either the first or second NFEMI antenna 100, 212 to the electrical apparatus 204. In this example circuit 500 the electrical apparatus 204 includes a transmitter circuit 502 having two power amplifiers 504, 506. The transmitter circuit 502 includes the first tuning capacitor 302 (Ctune1) coupling loading plate 125, 201 to the ground node 306, and the second tuning capacitor 304 (Ctune2) coupling loading plate 130, 202 to the ground node 306. The ground node 306 is coupled to the one or more of the ground plane(s) 216, 220, 224.

Voltages Vb1 and Vb2 are generated in series with capacitances Cb1 and Cb2 and an electrical field is thereby generated when the NFEMI antenna 100, 212 transmits signal power provided by the transmitter circuit 502. Voltages Va1 and Va2 are also generated and an additional in-phase electrical field is thereby generated when the NFEMI antenna 100, 212 transmits signal power provided by the transmitter circuit 502.

The additional voltages Vb1 and Vb2 add in-phase to voltages Va1 and Va2 and thus boost the NFEMI communications signal transmitted by the electrical apparatus 204 (e.g. resulting in a stronger NFEMI output signal).

Figure 6:
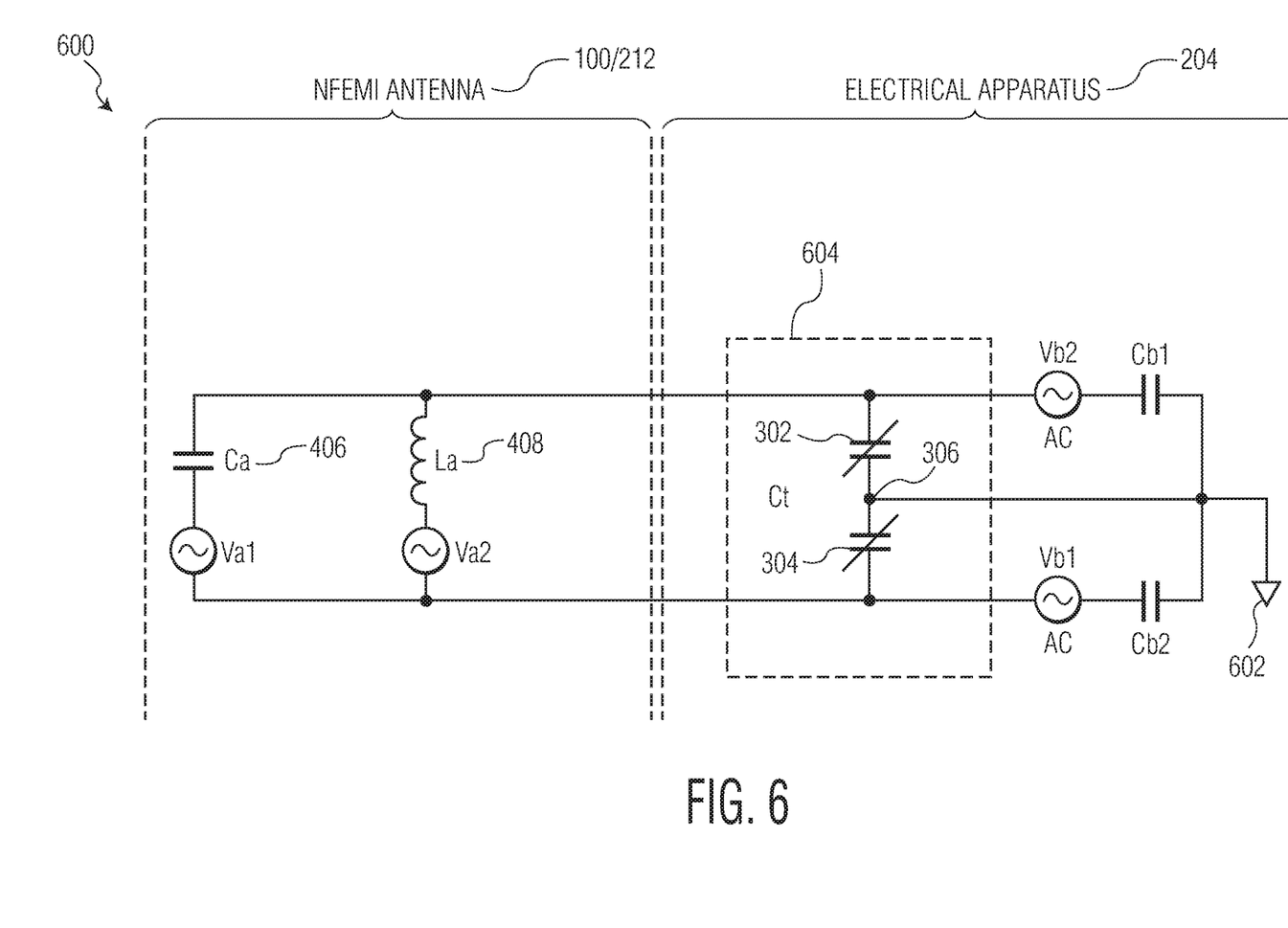
FIG. 6 is a fourth example electrical circuit for coupling either the first or second NFEMI antenna to the electrical apparatus.

FIG. 6 is a fourth example electrical circuit 600 for coupling either the first or second NFEMI antenna 100, 212 to the electrical apparatus 204. This fourth circuit 600 is similar to either the first, second, or third circuits 300, 400, 500 in FIGS. 3, 4 and 5, but is logically presented differently by grouping the ground plane(s) 216, 220, 224 into a single ground plane icon 602 with respect to a circuit portion 604 in the electrical apparatus 204.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A near-field electromagnetic induction (NFEMI) device, comprising:
   an NFEMI antenna, having a first conductive plate, a coil, a first signal feed connection, and a second signal feed connection, wherein the coil is configured to generate or respond to a magnetic field and is coupled to the first and second signal feed connections, and the first conductive plate is coupled to the first signal feed connection; and
   an electrical apparatus, having a ground plane, a first capacitor and a second capacitor, wherein the electrical apparatus is coupled to the first and second signal feed connections, the first capacitor is coupled between the first signal feed connection and a ground node coupled to the ground plane, the second capacitor is coupled between the second signal feed connection and a ground node coupled to the ground plane, and the first conductive plate in combination with the ground plane is configured to generate or respond to an electrical field.

2. The device of claim 1, wherein the first conductive plate and the ground plane together form a third capacitor configured to generate or respond to the electrical field.

3. The device of claim 1, wherein the NFEMI antenna includes a second conductive plate coupled to the second signal feed connection, the second conductive plate in combination with the first conductive plate is configured to generate or respond to the electrical field, and the second conductive plate in combination with the ground plane is configured to generate or respond to the electrical field.

4. The device of claim 3, wherein the second conductive plate and the ground plane together form a fourth capacitor configured to generate or respond to the electrical field.

5. The device of claim 3, wherein the first and second capacitors are tuning capacitors.

6. The device of claim 3, wherein the first conductive plate in combination with the second conductive plate is configured to generate or respond to a first voltage associated with the electrical field, the first conductive plate in combination with the ground plane is configured to generate or respond to a second voltage associated with the electrical field, the second conductive plate in combination with the ground plane is configured to generate or respond to a third voltage associated with the electrical field, and the first, second and third voltages are substantially in phase.

7. The device of claim 1, wherein the ground plane is embedded within at least one of: an integrated circuit, a receiver, a transmitter, a power amplifier, an LNA, an RF device, a circuit board, a chassis, a mechanical part, an electrical part.

8. The device of claim 1, wherein the electrical apparatus is embedded in the first conductive plate but the ground plane is electrically isolated from the first conductive plate.

9. The device of claim 8, wherein the first conductive plate includes an opening; and the ground plane is electrically isolated from the first conductive plate by the opening.

10. The device of claim 1, wherein the ground plane is a solid continuous plane of conductive material.

11. The device of claim 1, wherein the ground plane is a set of electrical traces coupled to electrical circuits in the electrical apparatus.

12. The device of claim 1, wherein the ground plane is a set of electrical traces isolated from all electrical circuits in the electrical apparatus.

13. The device of claim 1, wherein the coil is either wound around a ferrite material or formed on a surface of a planar substrate.

14. The device of claim 1, wherein the device is a wearable device.

15. The device of claim 1, wherein the NFEMI antenna is configured to operate at a carrier communications frequency below 30 MHz.

16. The device of claim 1, wherein the electrical apparatus includes at least one of: radio functionality, wireless functionality, a microprocessor, a digital signal processor, an audio amplifier, a data processing unit, or a human interface unit.

17. A wearable device including a near-field electromagnetic induction (NFEMI) apparatus, comprising:

an NFEMI antenna, having a first conductive plate, a coil, a first signal feed connection, and a second signal feed connection, wherein the coil is configured to generate or respond to a magnetic field and is coupled to the first and second signal feed connections; and the first conductive plate is coupled to the first signal feed connection; and an electrical apparatus, having a ground plane, a first capacitor and a second capacitor, wherein the electrical apparatus is coupled to the first and second signal feed connections, the first capacitor is coupled between the first signal feed connection and a ground node coupled to the ground plane, the second capacitor is coupled between the second signal feed connection and a ground node coupled to the ground plane, and the first conductive plate in combination with the ground plane is configured to generate or respond to an electrical field.

18. The device of claim 15, wherein the NFEMI antenna is configured to operate at a carrier communications frequency of about 10.6 MHz.

* * * * *